(12) United States Patent
Jeong et al.

(10) Patent No.: US 10,846,100 B2
(45) Date of Patent: Nov. 24, 2020

(54) ELECTRONIC DEVICE AND METHOD FOR CONTROLLING SAME

(71) Applicant: SAMSUNG ELECTRONICS CO., LTD., Suwon-si (KR)

(72) Inventors: Bok-deuk Jeong, Yongin-si (KR); Anton Yakovlev, Moscow (RU); Vasily Leonenko, Moscow (RU); Sung-min Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 188 days.

(21) Appl. No.: 15/773,658

(22) PCT Filed: Nov. 11, 2016

(86) PCT No.: PCT/KR2016/012429
§ 371 (c)(1),
(2) Date: May 4, 2018

(87) PCT Pub. No.: WO2017/082570
PCT Pub. Date: May 18, 2017

(65) Prior Publication Data
US 2018/0329715 A1 Nov. 15, 2018

(30) Foreign Application Priority Data
Nov. 11, 2015 (KR) .................. 10-2015-0157995

(51) Int. Cl.
*G06F 9/44* (2018.01)
*G06F 9/4401* (2018.01)
(Continued)

(52) U.S. Cl.
CPC ............... *G06F 9/441* (2013.01); *G06F 3/01* (2013.01); *G06F 3/038* (2013.01); *G06F 8/61* (2013.01);
(Continued)

(58) Field of Classification Search
CPC .... G06F 9/44502; G06F 9/44508; G06F 1/24; G06F 9/44526; G06F 15/177;
(Continued)

(56) References Cited

U.S. PATENT DOCUMENTS

| 8,166,349 B2 | 4/2012 | Cota-Robles et al. |
| 9,417,904 B2 | 8/2016 | Shin et al. |

(Continued)

FOREIGN PATENT DOCUMENTS

| EP | 2 709 004 | 3/2014 |
| JP | 2015-506020 | 2/2015 |

(Continued)

OTHER PUBLICATIONS

International Search Report for PCT/KR2016/012429 dated Feb. 10, 2017, 9 pages.
(Continued)

*Primary Examiner* — Zahid Choudhury
(74) *Attorney, Agent, or Firm* — Nixon & Vanderhye, P.C.

(57) ABSTRACT

Provided are an electronic device and a method for controlling same. In the method for controlling the electronic device, received is an input of a user command for executing a second OS during execution of a first OS. And a virtual sensor driver, for receiving sensor data from a sensor device, is provided when the second OS is executed. Sensor data is received from the sensor device by means of the provided virtual sensor driver. And the received sensor data is transmitted to an application of the second OS.

13 Claims, 8 Drawing Sheets

(51) Int. Cl.
*G06F 9/455* (2018.01)
*G06F 3/038* (2013.01)
*G06F 3/01* (2006.01)
*G06F 8/61* (2018.01)
*G06F 3/0346* (2013.01)

(52) U.S. Cl.
CPC .............. *G06F 9/44* (2013.01); *G06F 9/4411* (2013.01); *G06F 9/45558* (2013.01); *G06F 3/0346* (2013.01); *G06F 2009/45579* (2013.01)

(58) Field of Classification Search
CPC .............. G06F 9/44514; G06F 9/44523; G06F 11/1417; G06F 9/44505
See application file for complete search history.

(56) References Cited

U.S. PATENT DOCUMENTS

| | | | |
|---|---|---|---|
| 2002/0103996 | A1 | 8/2002 | Le Vasseur et al. |
| 2012/0278750 | A1 | 11/2012 | Abraham et al. |
| 2013/0227569 | A1 | 8/2013 | Kohli et al. |
| 2013/0289926 | A1 | 10/2013 | Maity et al. |
| 2014/0366021 | A1 | 12/2014 | Chinnamani et al. |
| 2014/0366023 | A1 | 12/2014 | Chinnamani et al. |
| 2014/0366025 | A1* | 12/2014 | Chinnamani ....... G06F 9/45545 718/1 |
| 2015/0082306 | A1 | 3/2015 | Shin et al. |
| 2015/0317185 | A1* | 11/2015 | Wu ..................... G06F 9/4806 713/100 |
| 2016/0124516 | A1* | 5/2016 | Schoon ................ G06F 1/1662 345/169 |
| 2016/0253207 | A1* | 9/2016 | Yoo ..................... G06F 3/0412 718/102 |
| 2017/0161098 | A1* | 6/2017 | Yin .......................... G06F 9/48 |

FOREIGN PATENT DOCUMENTS

| | | |
|---|---|---|
| KR | 10-2013-0014203 | 2/2013 |
| KR | 10-2015-0031124 | 3/2015 |
| WO | 2012/044792 | 4/2012 |

OTHER PUBLICATIONS

Written Opinion of the ISA w/ English Translation for PCT/KR2016/012429 dated Feb. 10, 2017, 12 pages.

* cited by examiner

ELECTRONIC DEVICE AND METHOD FOR CONTROLLING SAME

This application is the U.S. national phase of International Application No. PCT/KR2016/012429 filed Nov. 1, 2016 which designated the U.S. and claims priority to KR Patent Application No. 10-2015-0157995 filed Nov. 11, 2015, the entire contents of each of which are hereby incorporated by reference.

TECHNICAL FIELD

The present disclosure relates to an electronic device and a control method thereof, and more particularly, to an electronic device which shares a sensor device in an environment where a plurality of operating systems (OSs) are executed simultaneously, and a control method thereof.

DESCRIPTION OF RELATED ART

As various types of electronic devices have been increasingly used, various operating systems (OSs) have developed. Most of the related-art electronic devices have a single OS mounted therein. However, in recent years, many consumers are using electronic devices having unique OSs mounted therein to have different feelings from related-art electronic devices with existing OS.

However, there is a problem of software compatibility between electronic devices having different OSs mounted therein. Therefore, as users wish to use various application programs requiring dedicated OSs, multi-OS is executed in a single electronic device.

A guest OS may be executed in a host OS environment where a host OS is mounted in a single electronic device. However, sensor devices included in electronic devices do not have hardware standard specifications and thus hardware specifications of sensor devices vary according to manufacturers. Accordingly, there are problems that the sensor device cannot be used in the guest OS environment, and power consumption of a CPU increases and a processing speed is low.

SUMMARY

The present disclosure has been developed in order to solve the above-mentioned problems, and an object of the present disclosure is to provide an electronic device which configures a virtual sensor driver in an environment where a plurality of OSs are executed simultaneously, and uses a sensor device in the plurality of OSs, and a control method thereof.

According to an embodiment of the present disclosure to achieve the above-described object, a control method of an electronic device includes: receiving an input of a user command for executing a second OS during execution of a first OS; when the second OS is executed, configuring a virtual sensor driver to receive sensor data from a sensor device; receiving the sensor data from the sensor device by using the configured virtual sensor driver; and transmitting the received sensor data to an application of the second OS.

In addition, the receiving the sensor data may include: receiving an input of a user command for executing an application using the sensor device in the second OS execution environment; when the application is executed, requesting, by the application, sensor data from the second OS; collecting, by the virtual sensor driver, the sensor data from the first OS; and transmitting the collected sensor data to the application.

In addition, the receiving the sensor data may further include determining a size of a sharing buffer used to transmit the sensor data between the first OS and the second OS, based on a reception interval of the sensor data and sensitivity.

In addition, the virtual sensor driver may be activated only while an application using the sensor device is executed.

In addition, an application using the sensor device may be an application using any one of a gyroscope, an accelerometer, and a GPS.

In addition, the receiving the input of the user command for executing the second OS may be receiving an input of a user command of selecting an icon for executing the second OS.

According to an embodiment of the present disclosure to achieve the above-described object, an electronic device including: an inputter configured to receive an input of a user command; a sensor device configured to detect a surrounding environment; and a processor configured to control the inputter to receive an input of a user command for executing a second OS during execution of a first OS, when the second OS is executed, to configure a virtual sensor driver to receive sensor data detected at the sensor device from the first OS, and to transmit the sensor data received from the first OS to an application of the second OS by using the configured virtual sensor driver.

In addition, the processor may be configured to control the inputter to receive an input of a user command for executing an application using the sensor device in the second OS execution environment, when the application is executed, to request sensor data from the second OS, to transmit the sensor data from the first OS to the virtual sensor driver, and to transmit the transmitted sensor data to the application.

In addition, the processor may be configured to determine a size of a sharing buffer used to transmit the sensor data between the first OS and the second OS, based on a reception interval of the sensor data and sensitivity.

In addition, the processor may be configured to activate the virtual sensor driver only while an application using the sensor device is executed.

In addition, an application using the sensor device may be an application using any one of a gyroscope, an accelerometer, and a GPS.

In addition, when a user command of selecting an icon for executing the second OS is inputted, the processor may be configured to execute the second OS.

According to an embodiment of the present disclosure to achieve the above-described object, there is provided a computer-readable recording medium including a program for executing a sensor device sharing method in a multi-OS simultaneous execution environment, the sensor device sharing method in the multi-OS simultaneous execution environment including: receiving an input of a user command for executing a second OS during execution of a first OS; when the second OS is executed, configuring a virtual sensor driver to receive sensor data from a sensor device; receiving the sensor data from the sensor device by using the configured virtual sensor driver; and transmitting the received sensor data to an application of the second OS.

According to various embodiments of the present disclosure as described above, in an environment where a plurality of OSs are executed simultaneously in a single electronic device, a sensor device can be shared.

DETAILED DESCRIPTION OF EXAMPLE EMBODIMENTS

Terms used in embodiments of the present disclosure will be briefly explained, and embodiments will be described in detail.

The terms used in embodiments of the present disclosure are normal terms which are widely used and selected in consideration of the functions in the present disclosure. However, the terms may be changed according to an intention or a legal or technical interpretation of a person skilled in the art, and the advent of new technology. In addition, some terms may be arbitrarily selected by the applicant. In this case, meanings of the terms will be described in detail in corresponding detailed descriptions of the present disclosure. Accordingly, the terms used in embodiments of the present disclosure should be defined not based on names of the terms, but based on the meanings of the terms and the entire descriptions of the present disclosure.

The terms such as "first" and "second" used in embodiments may be used to explain various elements, and the elements should not be limited by these terms. These terms may be used only for the purpose of distinguishing one element from another element. For example, a first element may be named a second element without departing from the scope of right of the present invention, and similarly, a second element may be named a first element. The term "and/or" includes a combination of a plurality of related items or any one of the plurality of related items.

As used herein, the singular forms used in embodiments of the present disclosure are intended to include the plural forms as well, unless the context clearly indicates otherwise.

The term "include" or "have" used in embodiments of the present disclosure indicates the presence of features, numbers, steps, operations, elements, and components described in the specification, or a combination thereof, and do not preclude the presence or addition of one or more other features, numbers, steps, operations, elements, or components, or a combination thereof.

In addition, a "module" or "unit" used in embodiments of the present disclosure performs one or more functions or operations, and may be implemented by using hardware or software or a combination of hardware and software. In addition, a plurality of "modules" or a plurality of "units" may be integrated into one or more modules, except for a "module" or "unit" which needs to be implemented by specific hardware, and may be implemented as one or more processors.

In addition, in embodiments of the present disclosure, it will be understood that when an element is "connected with" another element, the element may be "directly connected with" another element, and the element may be "electrically connected with" another element with an intervening element therebetween.

In addition, a user input used in embodiments of the present disclosure may include at least one of a touch input, a bending input, a voice input, a button input, and a multimodal input, but is not limited thereto.

In addition, an "application" used in embodiments of the present disclosure refers to a set of computer programs designed to perform a specific task. In embodiments of the present disclosure, various applications are provided. For example, the applications may include a game application, a video play application, a map application, a memo application, a calendar application, a phone book application, a broadcasting application, an exercise support application, a payment application, a photo folder application, etc., but are not limited thereto.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology, and should not be interpreted as having ideal or exaggerated meanings unless they are clearly defined in embodiments.

Figure 1:
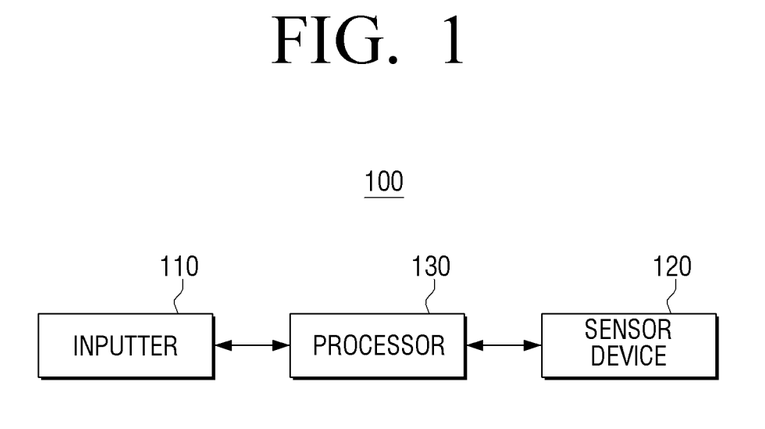
FIG. 1 is a block diagram schematically illustrating a configuration of an electronic device according to an embodiment of the present disclosure.

Hereinafter, the present disclosure will be described with reference to the accompanying drawings. FIG. 1 is a view illustrating a configuration of a user terminal according to an embodiment of the present disclosure. As shown in FIG. 1, the user terminal 100 may include an inputter 110, a sensor device 120, and a processor 130. The user terminal 100 according to an embodiment of the present disclosure may be implemented by using various electronic devices such as a smart phone, a smart watch, a tablet personal computer (PC), a notebook PC, a desktop, or the like.

The inputter 110 may receive an input of a user command for controlling the electronic device 100. In particular, the inputter 110 may receive an input of a user command for executing a second OS or a user command for executing an application.

The sensor device 120 detects a surrounding environment of the electronic device 100. In particular, the sensor device 120 may include various sensors such as a gyro sensor for detecting a rotational movement of the electronic device 100, an acceleration sensor for detecting an accelerated movement, a global positioning system (GPS) sensor for detecting location information, a pressure sensor, a noise sensor, or the like.

The processor 130 controls an overall operation of the electronic device 100. In particular, the processor 130 may configure a virtual sensor driver to receive sensor data from the sensor device when the second OS is executed during execution of a first OS. In addition, the processor 130 may receive sensor data from the sensor device by using the configured virtual sensor driver, and may transmit the sensor data to an application executed in the second OS.

Specifically, the processor 130 may control the inputter 110 to receive an input of a user command for executing the second OS during the execution of the first OS. According to an embodiment of the present disclosure, when a user command of selecting an icon is inputted to execute the second OS, the processor 130 may determine that the user command for executing the second OS is inputted. In this case, the first OS may be a host OS of the electronic device 100, and the second OS may be a guest OS. For example, in the electronic device operating with Android, the first OS may be Android and the second OS may be Window.

In addition, when the second OS is executed, the processor 130 may configure a virtual sensor driver to receive sensor data from the sensor device. In addition, the processor 130 may activate the virtual sensor driver only while an application using the sensor device is executed. The virtual sensor driver is not activated while the application using the sensor device is not executed, such that power consumption of the electronic device 100 and computing overhead can be minimized.

In addition, the processor 130 may transmit the sensor data from the sensor device to the second OS by using the configured virtual sensor driver. Specifically, the processor 130 may control the inputter 110 to receive an input of a user command for executing an application using the sensor device in the second OS execution environment. In this case, the application using the sensor device may be any one of an application using the gyro sensor, an application using the acceleration sensor, and an application using the GPS. In addition, when a user command for executing the application is inputted, the processor 130 may execute the application using the sensor device in the second OS execution environment. In addition, the processor 130 may deliver a request of the application requesting sensor data to the second OS. When the request of the application is delivered, the processor 130 may transmit the sensor data from the first OS to the virtual sensor driver. In addition, the processor 130 may transmit the sensor data to the application.

In addition, the processor 130 may determine a size of a sharing buffer which is used to transmit sensor data between the first OS and the second OS, based on a sensor data reception interval and sensitivity. For example, when an application requiring high sensitivity is executed, the processor 140 may increase the size of the sharing buffer used to transmit sensor data between the first OS and the second OS, in comparison to the case where an application requiring low sensitivity is executed (for example, the gyro sensor may be set to recognize a movement value when the electronic device 100 moves by a predetermined value or more. In this case, as the predetermined value is smaller, the sensitivity is higher, and, as the predetermined value is larger, the sensitivity is lower). In another example, when a sensor data reception interval requested by the application is shorter, the processor 130 may increase the size of the sharing buffer used to transmit data sensor between the first OS and the second OS.

Figure 2:
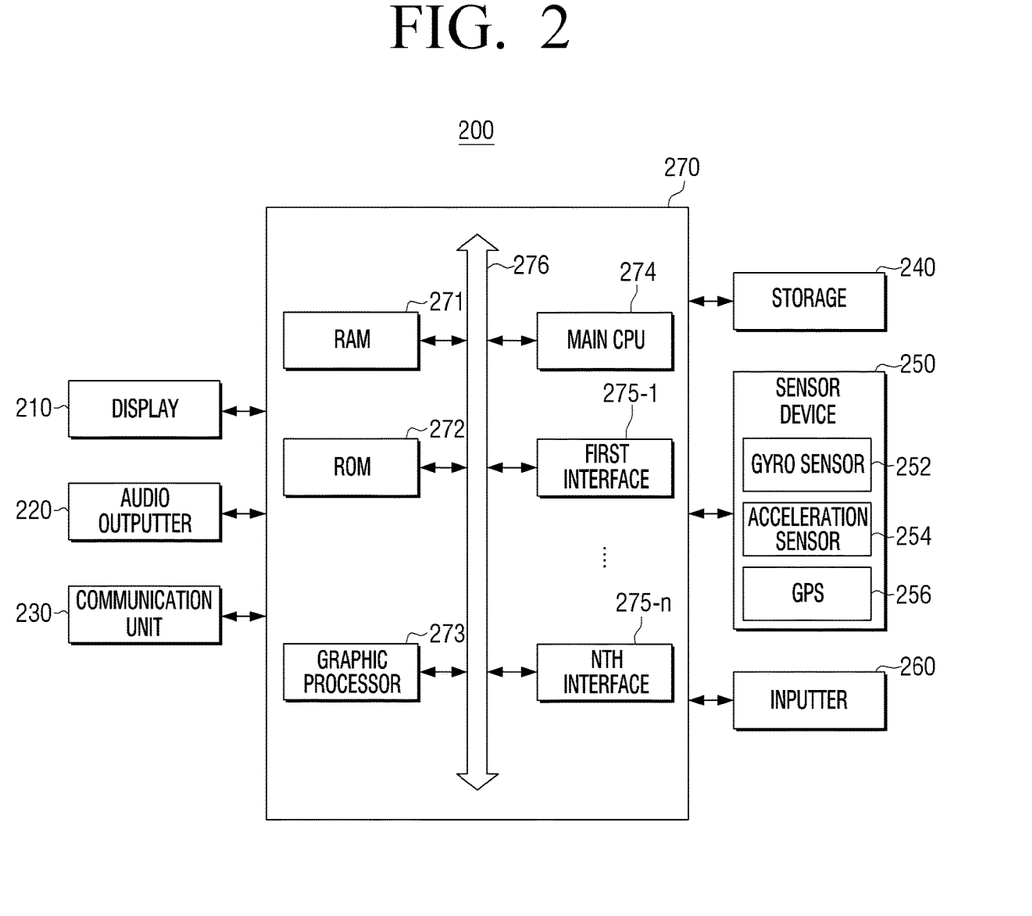
FIG. 2 is a block diagram illustrating a configuration of an electronic device in detail according to an embodiment of the present disclosure.

Hereinafter, various embodiments of the present disclosure will be described with reference to FIGS. 2 to 6. FIG. 2 is a block diagram illustrating a configuration of an electronic device 200 in detail according to an embodiment of the present disclosure. As shown in FIG. 2, the electronic device 200 may include a display 210, an audio outputter 220, a communication unit 230, a storage 240, a detector 250, an inputter 260, and a processor 270.

FIG. 2 depicts that the electronic device 200 is a device that is provided with various functions such as an input function, a transmitting and receiving function, a display function, etc., and illustrates overall elements. Accordingly, according to an embodiment, some of the elements illustrated in FIG. 2 may be omitted or changed, and other elements may further be added.

The display 210 may display a video frame which is processed at an image processor (not shown) from image data received from an image receiver (not shown), and at least one of various screens generated at a graphic processor 273.

The audio outputter 220 is configured to output not only various audio data for which various processing operations, such as decoding, amplification, noise filtering, etc., are performed by an audio processor (not shown), but also various notification sounds or voice messages. In particular, the audio outputter 220 may be implemented by using a speaker, but this is merely an example. The audio outputter 220 may be implemented by using an output terminal which is capable of outputting audio data.

The communication unit 230 is configured to communicate with various kinds of external devices in various communication methods. The communication unit 230 may include various communication chips, such as a WiFi chip, a Bluetooth chip, a near field communication (NFC) chip, a wireless communication chip, etc. In this case, the WiFi chip, the Bluetooth chip, and the NFC chip perform communication in a WiFi method, a Bluetooth method, and an NFC method, respectively. In particular, the NFC chip refers to a chip which operates in an NFC method using a band of 13.56 MHz from among various RF-ID frequency bands such as 135 kHz, 13.56 MHz, 433 MHz, 860-960 MHz, and 2.45 GHz. When the WiFi chip or the Bluetooth chip is used, a variety of connection information such as an SSID and a session key may be exchanged first, and communication may be established using the connection information, and then a variety of information may be exchanged. The wireless communication chip refers to a chip which performs communication according to various communication standards such as IEEE, Zigbee, $3^{rd}$ generation (3G), $3^{rd}$ generation partnership project (3GPP), long term evolution (LTE), and the like.

The storage 240 may store various modules for driving the electronic device 200. For example, the storage 240 may store software including a base module, a sensing module, a communication module, a presentation module, a web browser module, and a service module. In this case, the base module is a base module that processes signals transmitted from hardware included in the electronic device 200, and transmits the signals to an upper layer module. The sensing module is a module that collects information from various sensors and analyzes and manages the collected information, and may include a face recognition module, a voice recognition module, a motion recognition module, an NFC recognition module, or the like. The presentation module is a module for configuring a display screen, and may include a multimedia module for reproducing and outputting a multimedia content, and a UI rendering module for performing UI and graphic processing. The communication module is a module for communicating with the outside. The web browser module refers to a module that accesses a web server by performing web browsing. The service module is a module including various applications for providing various services.

As described above, the storage 240 may include various program modules, but some of the various program modules may be omitted or changed according to a type and characteristics of the electronic device 200, or other program modules may be added. For example, when the above-described electronic device 200 is implemented by using a tablet PC, the base module may further include a location determination module for determining a location based on GPS, and the sensing module may further include a sensing module for detecting a user's motion.

According to an embodiment of the present disclosure, the storage 240 may be defined as including a read only memory (ROM) 272 and a random access memory (RAM) 271 in the processor 270, or a memory card (not shown) mounted in the electronic device 200 (for example, a micro SD card, a memory stick).

The sensor device 250 detects a surrounding environment of the electronic device 200. In particular, the detector 250 may include various sensors such as a GPS sensor for detecting location information, a motion detection sensor for detecting a motion of the electronic device 200 (for example, a gyro sensor, an acceleration sensor, or the like), a pressure sensor, a noise sensor, or the like.

The inputter 260 receives an input of a user command for controlling the electronic device 200. In particular, the inputter 260 receives an input of a user command for executing the second OS and a user command for executing an application using the sensor device in the second OS execution environment. The inputter 260 may include various input devices, such as a touch input unit, a button input unit, a voice input unit including a microphone or the like, a motion input unit, a keyboard, a mouse, or the like, to receive an input of a user command.

The processor 270 includes the RAM 271, the ROM 272, the graphic processor 273, a main CPU 274, first and n-th interfaces 275-1 to 275-n, and a bus 276, as shown in FIG. 2. In this case, the RAM 271, the ROM 272, the graphic processor 273, the main CPU 274, and the first to n-th interfaces 275-1 to 275-n may be connected with one another via the bus 276.

The ROM 272 stores a set of instructions for booting a system. When a turn-on command is inputted and power is supplied, the main CPU 274 copies an OS stored in the storage 240 onto the RAM 271 according to an instruction stored in the ROM 272, executes the OS and boots the system. When booting is completed, the main CPU 274 copies various application programs stored in the storage 240 onto the RAM 271, executes the application programs copied onto the RAM 271, and performs various operations.

The graphic processor 274 may generate a screen including various objects, such as a pointer, an icon, an image, a text, and the like, by using a calculator (not shown) and a renderer (not shown). The calculator (not shown) calculates attribute values of the objects to be displayed, such as coordinate values, shape, size, color, and the like, according to the layout of the screen, based on a control command received from the inputter. The renderer (not shown) generates a screen of various layouts including the objects based on the attribute values calculated by the calculator. The screen generated by the renderer (not shown) may be displayed on a display region of the display 210.

The main CPU 274 may access the storage 240 and performs booting using the OS stored in the storage 240. In addition, the main CPU 274 performs various operations by using various programs, contents, data, or the like stored in the storage 240.

The first to n-th interfaces 275-1 to 275-n may be connected with the above-described elements. One of the interfaces may be a network interface connected to an external device via a network.

In particular, when the second OS is executed while the first OS is being executed, the processor 270 configures a virtual sensor driver to receive sensor data from the sensor device 250. In addition, the processor 270 may transmit the sensor data from the sensor device to the second OS by using the configured virtual sensor driver. In addition, the processor 270 transmits the sensor data from the second OS to an application executed in the second OS.

Figure 3:
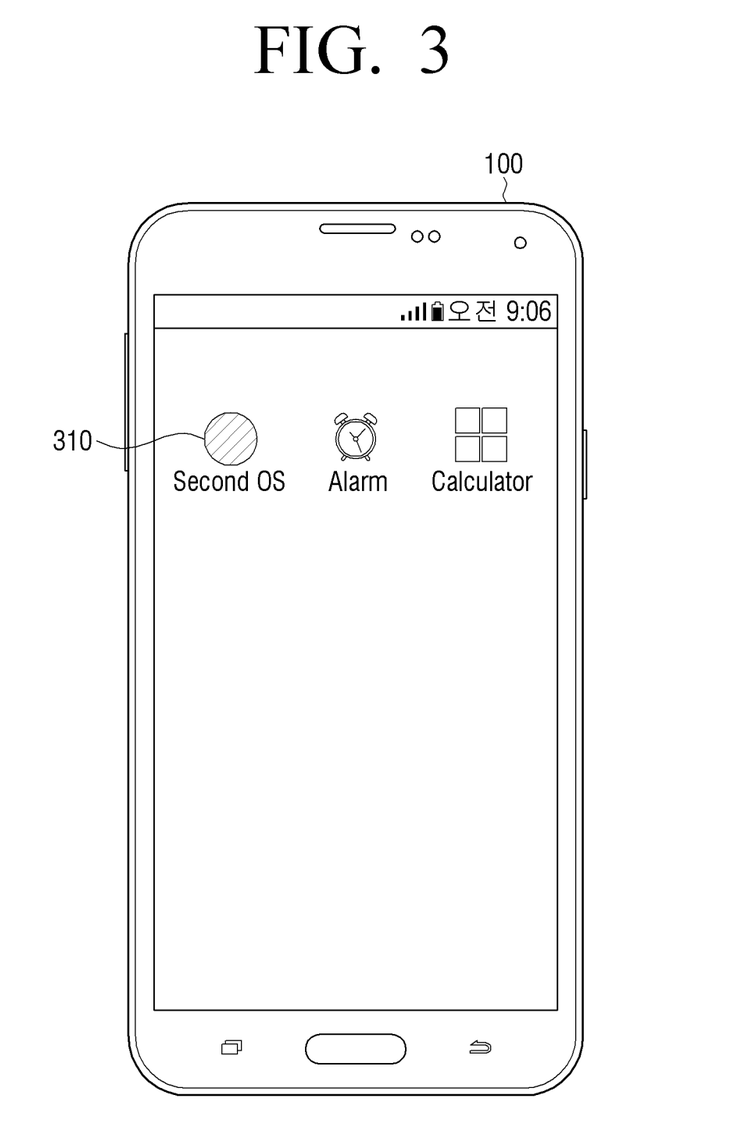
FIGS. 3, 4, 5, and 6 are views to explain various embodiments of sharing a sensor device in an environment where a plurality of OSs are executed simultaneously according to various embodiments of the present disclosure.

Specifically, the processor 270 may receive an input of a user command for executing the second OS through the inputter 260 during the execution of the first OS. For example, when a user command for selecting a second OS execution icon 310, displayed on a standby screen, is inputted as shown in FIG. 3, the processor 270 may execute the second OS. Receiving the input of the user command of selecting the icon 310 to execute the second OS is merely an example, and the second OS may be executed in various methods, such as voice recognition.

Figure 4:
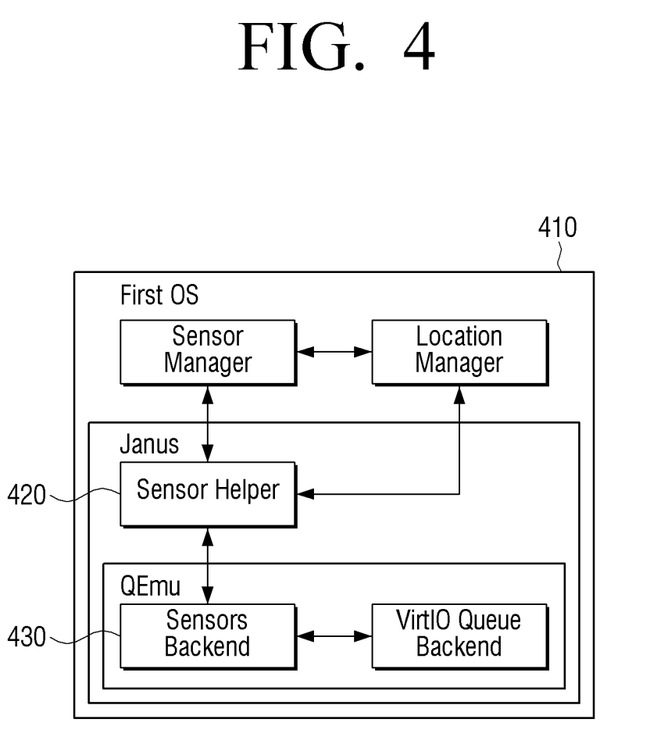
Figure 5:
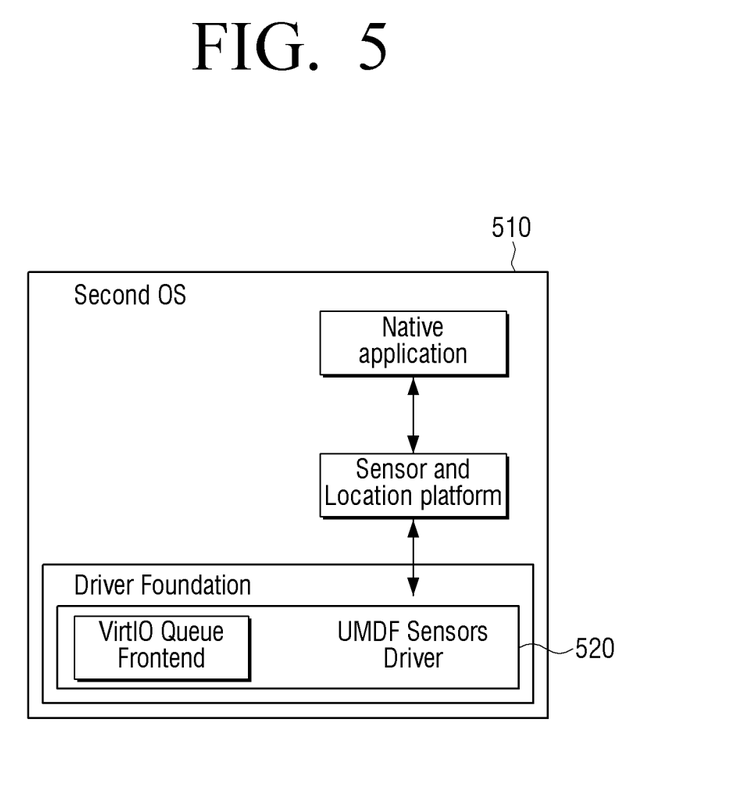

In addition, when the second OS is executed, the processor 270 may configure the virtual sensor driver to receive sensor data as shown in FIGS. 4 and 5. Specifically, the processor 270 may configure the virtual sensor driver in the second OS, by using a split driver-based virtualization method. As shown in FIG. 4, the processor 270 may configure a sensor helper 420 and a sensors backend 430 in the first OS 410. The sensors backend 430 may receive the sensor data from the sensor device. When the sensor data is received from the sensor device, the sensors backend 430 may transmit the sensor data to a virtIO queue frontend configured in the second OS. Alternatively, the sensors backend 430 and the virtIO queue frontend may exchange the sensor data with each other through a virtIO queue between the sensors backend 430 and the virtIO queue frontend.

In addition, as shown in FIG. 5, the processor 270 may configure a user-mode driver framework (UMDF) sensors driver 520. The UMMF sensors driver 520 may exchange the sensor data with the sensors backend 430 by using the virtIO queue frontend. In addition, the UMMF sensors driver 520 may perform a direct interaction, such as transmitting sensor data to an application executed in the second OS, by using the virtIO queue frontend.

Figure 6:
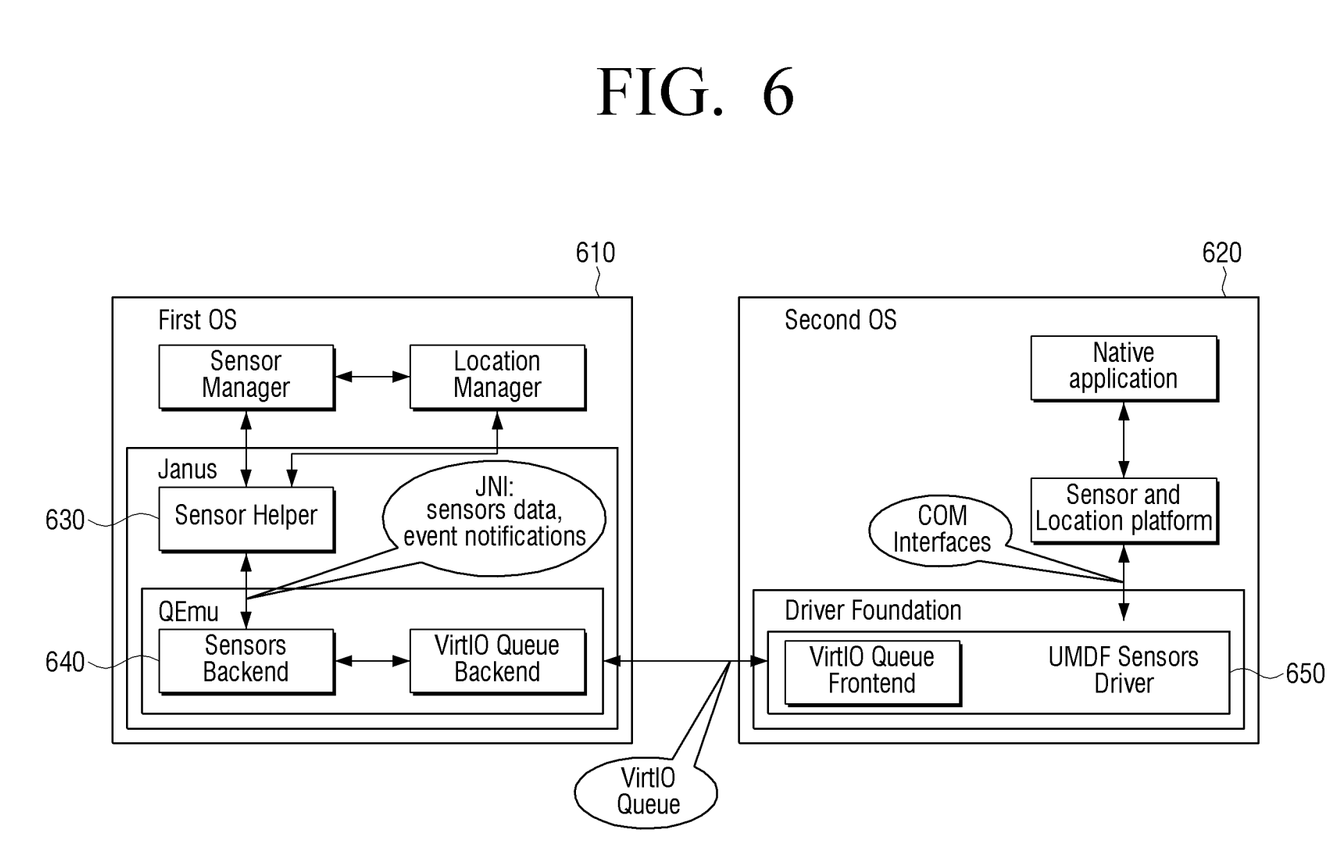

In addition, as shown in FIG. 6, the processor 270 may transmit sensor data between the first OS 610 and the second OS 620. For example, the processor 270 may control the inputter 260 to receive an input of a user command for executing the second OS during the execution of the first OS. In addition, the processor 270 may control the inputter 260 to receive an input of a user command for executing a map application during the execution of the second OS. When the map application is executed, the processor 270 may configure a virtual sensor driver to receive location data from the GPS. In addition, the processor 270 may transmit the location data from the GPS to the second OS by using the virtual sensor driver, and may transmit the location data transmitted to the second OS to the map application executed in the second OS.

In another example, the processor 270 may control the inputter 260 to receive an input of a user command for executing the second OS during the execution of the first OS. In addition, the processor 270 may control the inputter 260 to receive an input of a user command for executing a game application using a motion sensor (at least one of the gyro sensor and the acceleration sensor) during the execution of the second OS. When the game application is executed, the processor 270 may configure a virtual sensor driver to receive motion data from at least one of the gyro sensor and the acceleration sensor. In addition, the processor 270 may transmit the motion data from at least one of the gyro sensor and the acceleration sensor to the second OS by using the virtual sensor driver, and may transmit the motion data transmitted to the second OS to the game application executed in the second OS. Accordingly, the game application may provide the same result as using at least one of the gyro sensor and the acceleration sensor, based on the transmitted motion data.

According to an embodiment of the present disclosure, the processor 270 may activate the virtual sensor driver only while an application using the sensor device is being executed. Since the virtual sensor driver is not activated while the application using the sensor device is not executed, power consumption of the electronic device 100 and computing head can be minimized.

According to another embodiment of the present disclosure, the processor 270 may determine a size of a sharing buffer which is used to transmit sensor data between the first OS and the second OS, based on a sensor data reception interval and sensitivity. For example, when an application requiring high sensitivity is executed, the processor 130 may increase the size of the sharing buffer used to transmit sensor data between the first OS and the second OS, in comparison to the case where an application requiring low sensitivity is executed.

Figure 7:
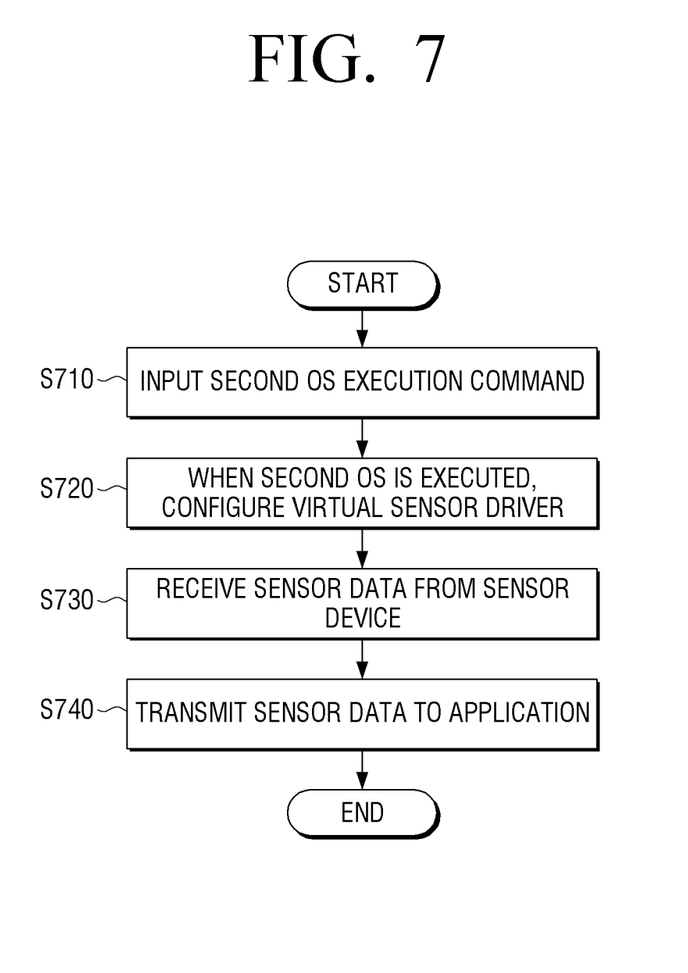
FIGS. 7 and 8 are flowcharts to illustrate a control method of an electronic device according to various embodiments of the present disclosure.

Hereinafter, a control method of the electronic device 100 according to an embodiment of the present disclosure will be described with reference to FIG. 7.

First, the electronic device 100 may receive an input of a second OS execution command in a first OS execution environment (S710).

In addition, when the second OS is executed and an environment where the first OS and the second OS are executed simultaneously is provided, the electronic device 100 configures a virtual sensor driver to receive sensor data from the sensor device (S720). In this case, the electronic device 100 may activate the virtual sensor driver only while an application using the sensor device is executed in the second OS.

In addition, the electronic device 100 may transmit the sensor data from the sensor device to the second OS by using the virtual sensor driver (S730). In addition, the electronic device 100 may determine a size of a sharing buffer used to transmit sensor data between the first OS and the second OS, based on a sensor data reception interval and sensitivity. In this case, the sensor data may be data indicating a location, a motion, an acceleration, etc. of the electronic device 100 detected at the sensor device.

In addition, the electronic device 100 may transmit the sensor data transmitted to the second OS to an application executed in the second OS environment (S740).

Figure 8:
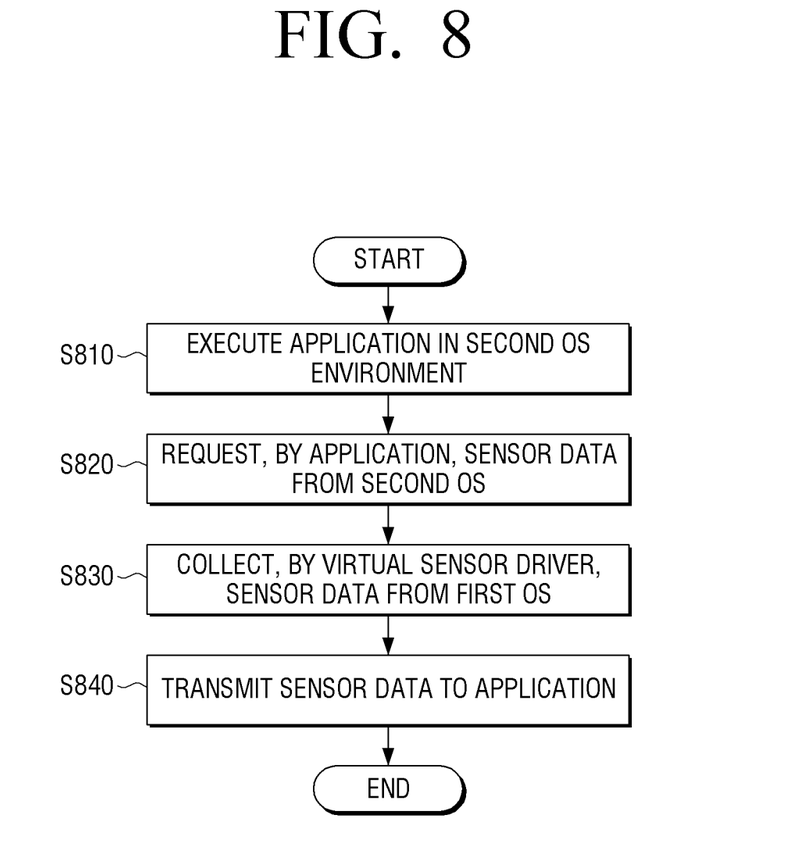

Hereinafter, a method for transmitting sensor data from the sensor device to the second OS by using the virtual sensor driver according to an embodiment of the present disclosure will be described with reference to FIG. 8.

First, when a user command for executing an application using the sensor device in the second OS environment is inputted while the first OS and the second OS are executed simultaneously, the electronic device 100 may execute the application using the sensor device in the second OS environment (S810).

In addition, when an operation using sensor data is performed during the execution of the application, the electronic device 100 may transmit a sensor data request of the application to the second OS (820).

In addition, the electronic device 100 may transmit the sensor data from the first OS to the second OS by using the virtual sensor driver (S830). In this case, the sensor data may be data indicating a location, a motion, an acceleration, etc. of the electronic device 100 detected at the sensor device.

In addition, the electronic device 100 may transmit the sensor data transmitted to the second OS to the application executed in the second OS environment (S840).

According to various embodiments of the present disclosure described above, the sensor device can be used in the second OS execution environment. Accordingly, the sensor device can be shared in the environment where the plurality of OSs are executed simultaneously.

The above-described method may be programmed by a program executable in a computer, and may be implemented in a generic-purpose digital computer which operates the program by using a computer-readable recording medium. In addition, a structure of data used in the above-described method may be recorded on a computer-readable recording medium through various means. The computer-readable recording medium includes a storage medium such as a magnetic storage medium (for example, a ROM, a floppy disk, a hard disk, etc.) or an optical reading medium (for example, a CD-ROM, a digital versatile disc (DVD), etc.).

It will be understood by a person skilled in the art that the present disclosure can be implemented in modified forms without departing from the essential characteristics of the present disclosure. Therefore, disclosed methods should be considered from a descriptive perspective, not from a limited perspective. The scope of the present disclosure is defined not by the detailed description but by the appended claims, and all differences within the scope should be understood as being included in the present disclosure.

What is claimed is:

1. A control method of an electronic device, the control method comprising:
   receiving an input of a user command for executing a second OS during execution of a first OS;
   when the second OS is executed, configuring a virtual sensor driver to receive sensor data from a sensor device;
   receiving the sensor data from the sensor device by using the configured virtual sensor driver; and
   transmitting the received sensor data to an application of the second OS.

2. The control method of claim 1, wherein the receiving the sensor data comprises:
   receiving an input of a user command for executing an application using the sensor device in an execution environment of the second OS;
   when the application is executed, requesting, by the application, sensor data from the second OS;
   collecting, by the virtual sensor driver, the sensor data from the first OS; and
   transmitting the collected sensor data to the application.

3. The control method of claim 1, wherein the receiving the sensor data further comprises determining a size of a sharing buffer used to transmit the sensor data between the first OS and the second OS, based on a reception interval of the sensor data and sensitivity.

4. The control method of claim 1, wherein the virtual sensor driver is activated only while an application using the sensor device is executed.

5. The control method of claim 1, wherein an application using the sensor device is an application using any one of a gyroscope, an accelerometer, and a GPS.

6. The control method of claim 1, wherein the receiving the input of the user command for executing the second OS comprises receiving an input of a user command of selecting an icon for executing the second OS.

7. An electronic device comprising:
- an inputter configured to receive an input of a user command;
- a sensor device configured to detect a surrounding environment; and
- a processor configured to control the inputter to receive an input of a user command for executing a second OS during execution of a first OS, when the second OS is executed, to configure a virtual sensor driver to receive sensor data detected at the sensor device from the first OS, and to transmit the sensor data received from the first OS to an application of the second OS by using the configured virtual sensor driver.

8. The electronic device of claim 7, wherein the processor is configured to control the inputter to receive an input of a user command for executing an application using the sensor device in an execution environment of the second OS, when the application is executed, to request sensor data from the second OS, to transmit the sensor data from the first OS to the virtual sensor driver, and to transmit the transmitted sensor data to the application.

9. The electronic device of claim 7, wherein the processor is configured to determine a size of a sharing buffer used to transmit the sensor data between the first OS and the second OS, based on a reception interval of the sensor data and sensitivity.

10. The electronic device of claim 7, wherein the processor is configured to activate the virtual sensor driver only while an application using the sensor device is executed.

11. The electronic device of claim 7, wherein an application using the sensor device is an application using any one of a gyroscope, an accelerometer, and a GPS.

12. The electronic device of claim 7, wherein, when a user command of selecting an icon for executing the second OS is inputted, the processor is configured to execute the second OS.

13. A non-transitory computer-readable recording medium comprising a program for executing sensor device sharing method in a multi-OS simultaneous execution environment, the sensor device sharing method in the multi-OS simultaneous execution environment comprising:
- receiving an input of a user command for executing a second OS during execution of a first OS;
- when the second OS is executed, configuring a virtual sensor driver to receive sensor data from a sensor device;
- receiving the sensor data from the sensor device by using the configured virtual sensor driver; and
- transmitting the received sensor data to an application of the second OS.

* * * * *